United States Patent [19]
Watrous

[11] 3,864,606
[45] Feb. 4, 1975

[54] COMPENSATED SEQUENCING CIRCUIT FOR FIRING PHOTOFLASH LAMPS

[75] Inventor: Donald L. Watrous, Liverpool, N.Y.

[73] Assignee: General Electric Company, Schenectady, N.Y.

[22] Filed: Oct. 24, 1972

[21] Appl. No.: 299,652

[52] U.S. Cl. ............... 317/80, 240/1.3, 315/323, 431/95, 354/33
[51] Int. Cl. .............................................. F23q 7/02
[58] Field of Search .......... 431/93, 94, 95; 240/1.3; 95/11.5 R; 315/151, 232, 241 P, 323; 317/80; 354/33, 143

[56] References Cited
UNITED STATES PATENTS

| | | | |
|---|---|---|---|
| 3,518,487 | 6/1970 | Tanaka et al. | 315/232 |
| 3,618,492 | 11/1971 | Ellin | 95/11.5 |
| 3,668,468 | 6/1972 | Kornrumpf et al. | 315/323 |
| 3,676,045 | 7/1972 | Watrous et al. | 431/95 |
| 3,699,861 | 10/1972 | Burgarella et al. | 95/11.5 |
| 3,714,508 | 1/1973 | Harnden et al. | 315/241 P |
| 3,758,817 | 9/1973 | Elliott | 315/151 |
| 3,787,167 | 1/1974 | Watrous | 431/95 |

*Primary Examiner*—Volodymyr Y. Mayewsky
*Attorney, Agent, or Firm*—Norman C. Fulmer; Lawrence R. Kempton; Frank L. Neuhaus

[57] ABSTRACT

A circuit for compensating a photoflash lamp sequencing flashing circuit, with respect to changes in temperature, voltage and current, to insure flashing of a single lamp of a flash lamp array each time a flash picture is taken. A transistorized compensation circuit applies a compensating voltage to a sequencing transistor in each stage of the sequencing circuit.

11 Claims, 2 Drawing Figures

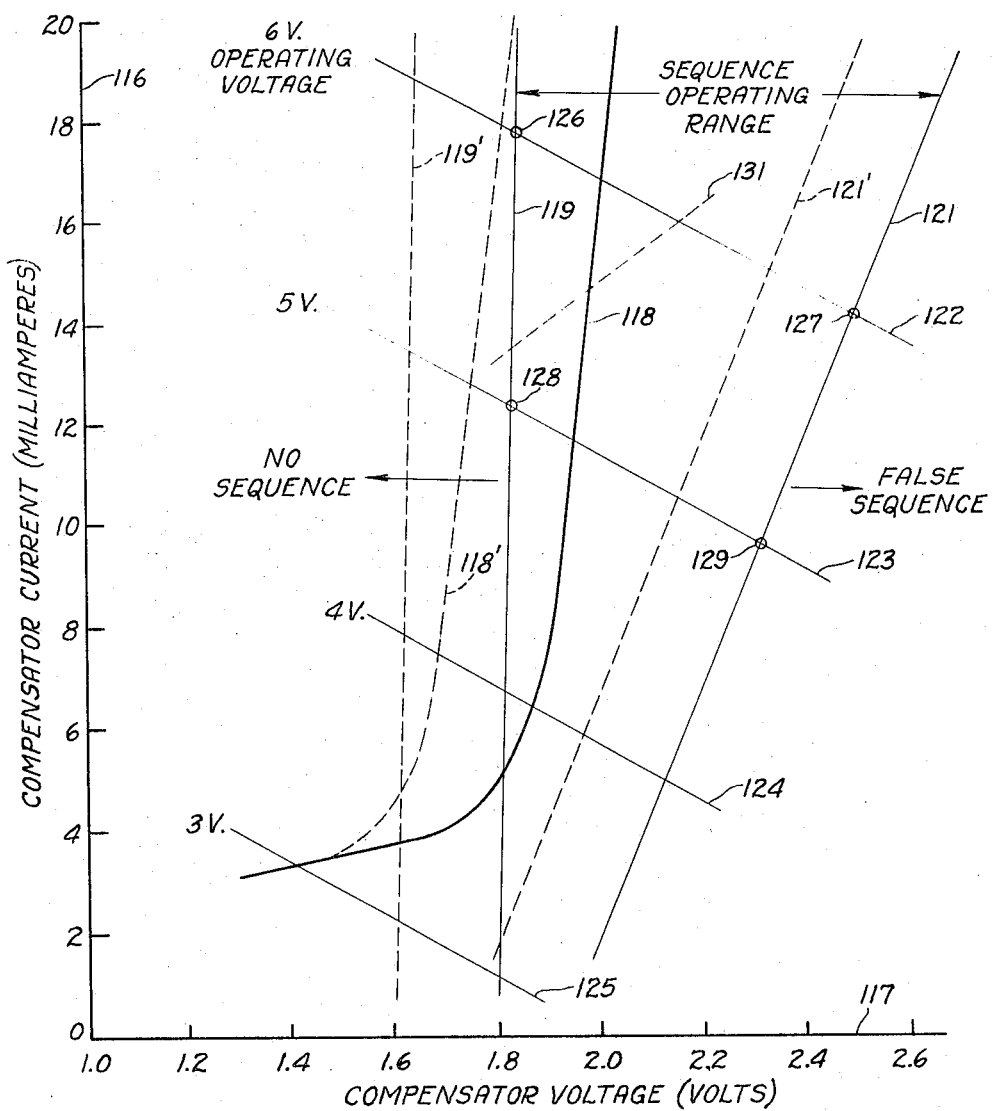

COMPENSATED SEQUENCING CIRCUIT FOR FIRING PHOTOFLASH LAMPS

CROSS-REFERENCES TO RELATED APPLICATIONS

Patent application Ser. No. 299,653, filed concurrently herewith, Donald L. Watrous, "Current Sensing Circuit for Determining Flashing of a Photoflash Lamp," now U.S. Pat. No. 3,787,167 and assigned the same as the present invention.

Patent application Ser. No. 299,651, filed concurrently herewith, Donald L. Watrous, "Stabilized Latching Circuitry in a Sequencing Circuit for Firing Photoflash Lamps," assigned the same as the present invention.

Patent application Ser. No. 299,654, filed concurrently herewith, Donald L. Watrous, "Sequencing Circuit for Firing Photoflash Lamps in Predetermined Order," assigned the same as the present invention.

BACKGROUND OF THE INVENTION

The invention is in the field of flash photography, and is particularly directed to circuitry for causing sequential flashing of the lamps in an array of flash lamps.

Various circuits have been devised, for use in a camera or flash attachment, to cause one-at-a-time sequential flashing of the flash lamps of an array of photoflash lamps, so that a different lamp of the array is flashed each time a flash picture is taken. Circuits of this type are disclosed in U.S. Pat. No. 3,676,045 to Donald Watrous and Paul Coté (assigned the same as this invention). Suitable flash-lamp arrays for use with such circuits are disclosed in U.S. Pat. Nos. 3,598,984 to Stanley Slomski and 3,598,985 to John Harnden and William Kornrumpf (both assigned the same as this invention).

The above-referenced Watrous and Coté ciruit employs solid-state switch devices such as SCR's (silicon controlled rectifiers) respectively in series between the flash lamps of the array and a lamp-firing voltage source. Transistor circuitry interconnects these SCR's in a manner for causing them to sequence, quickly and in a predetermined order, to their "on" condition until an unflashed lamp becomes flashed, whereupon current-sensing means responds to the current flow in the flashing lamp and actuates a latch circuit which inhibits further sequencing of the SCR's so that no more than one flash lamp will be flashed per flash picture. The procedure repeats for each flash picture, until all of the lamps of the array have been flashed. For a dual-sided array, having five flash lamps on each side for example, the five lamps on one side are flashed, one-at-a-time, for taking five flash pictures, and then the array is turned around and five more flash pictures are taken. The operating characteristics of the solid-state devices in the sequencing circuit have an inherent dependency on both temperature and operating voltage, so that there are certain temperature-voltage combinations for which the circuit will fail to sequence and hence will fail to flash a lamp, and there are certain temperature-voltage combinations for which the circuit will falsely sequence and undesirably flash one or more lamps.

SUMMARY OF THE INVENTION

Objects of the invention are to provide an improved circuit for sequentially flashing the lamps of an array of flash lamps, and to provide such a circuit which functions reliably over a wide range of temperatures and operating voltages.

The invention comprises, briefly and in a preferred embodiment, a compensator circuit connected to apply a variable compensating voltage to an electrode of a sequencing transistor in each of the sequencing stages that are successively connected between the SCR (silicon controlled rectifier) switches which are respectively connected in series with the lamps of an array of flash lamps as disclosed in the above-referenced Watrous and Coté patent. The compensator circuit comprises an arrangement of a transistor amplifier and a load resistor connected in series across points of operating voltage for the sequencing circuit, and means connecting the input of the amplifier to the junction of the amplifier and the load resistor. The compensating voltage appears at the junction of the transistor amplifier and load resistor, and is applied to an electrode of a transistor in each sequencing stage. When the temperature or operating voltage increases, the sequencing circuit may fire two or more flash lamps instead of one. Conversely, when the temperature or operating voltage decreases, the sequencing circuit may fail to sequence. The compensating voltage, however, varies in a direction with respect to changes in temperature and operating voltage so as to compensate for the variable sensitivity and operating characteristics of the sequencing circuit. The compensating voltage decreases with increasing temperature and with decreasing operating voltage, and vice versa. With respect to changes in operating voltage, the corresponding changes in the compensating voltage are relatively smaller. Preferably the compensator circuit is connected to receive operating voltage from the low-voltage end of a current-sensing resistor that is connected in series with the lamps in the flash lamp array, so that as a lamp is flashing the voltage drop in the current-sensing resistor causes a reduction in the compensating voltage, which in turn helps to insure that no further sequencing can occur, and no additional lamps will flash, while taking a picture. The compensator circuit, in addition to the functions already described, also functions to provide a compensating voltage that is relatively stabilized with respect to changes in the amount of current drawn by the sequencing stages from the compensator circuit.

The sequential flash circuit of the invention can operate reliably over a temperature range of from below 0° C to over 100° C, and over an operating voltage range of about 4 to 6 volts d.c.

BRIEF DESCRIPTION OF THE DRAWING

FIG. 2 is a set of curves illustrating the operation of the circuit of FIG. 1.

DESCRIPTION OF THE PREFERRED EMBODIMENT

Figure 1:
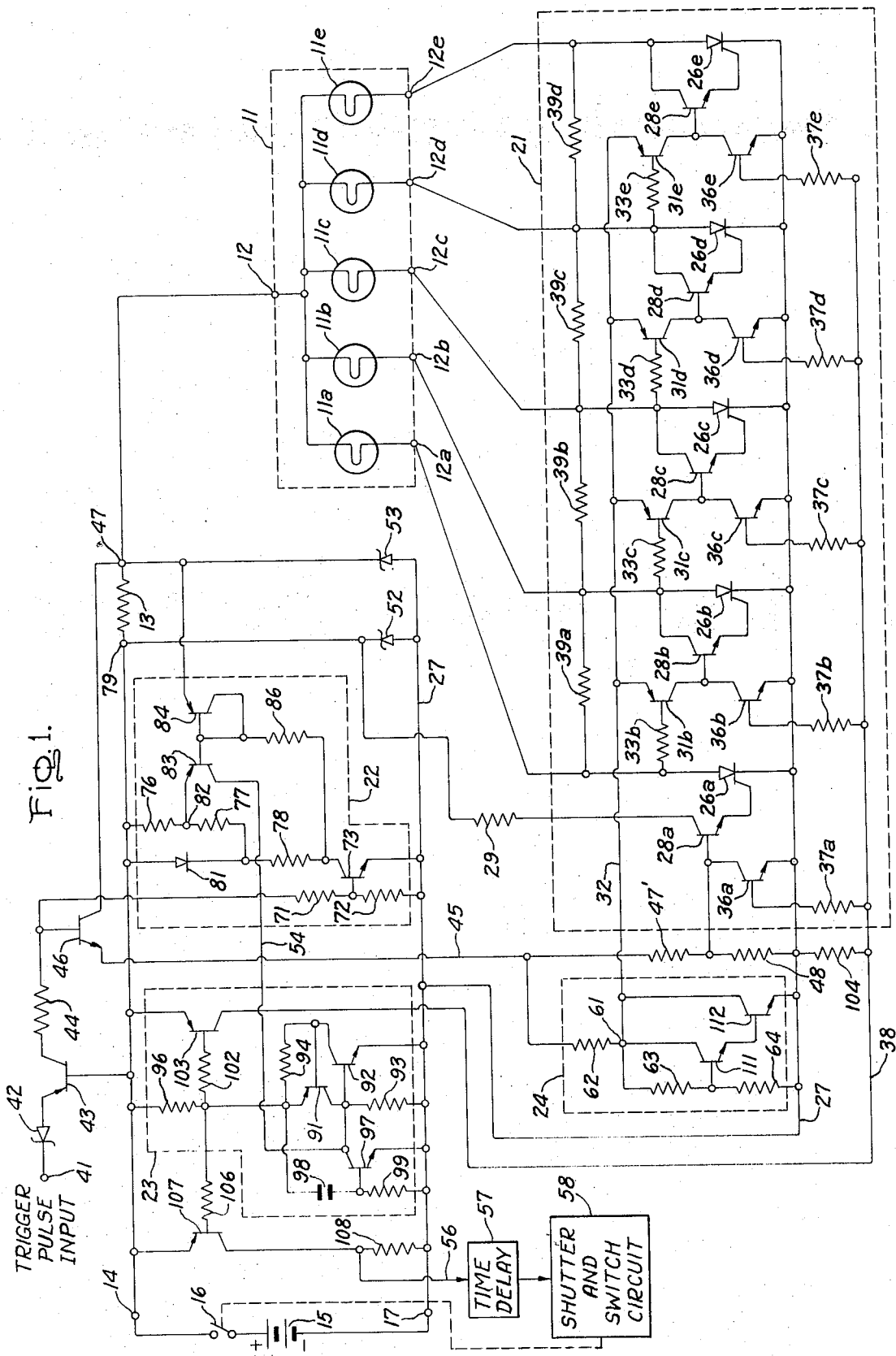
FIG. 1 is an electrical schematic diagram of a circuit in accordance with a preferred embodiment of the invention.

In FIG. 1, a flash lamp array 11 is provided with a plurality of photoflash lamps 11a through 11e, arranged with reflectors if desired, so that each lamp when flashed radiates light in the same direction. If desired, another set of flash lamps may be arranged at the other side of the array, all as described in the above-referenced patents to Slomski and to Harnden and Kornrumpf. A plug-in terminal means 12 is connected to an end of each filament of the lamps 11a through 11e in the array, and additional plug-in terminal means 12a through 12w are respectively connected to the remaining ends of the filaments of the flash lamps. A resistor 13, which functions to sense current flow through a flashing lamp, is connected between the common array terminal 12 and a positive operating potential terminal 14, to which the positive polarity terminal of a battery 15 is connected via a switch 16, the negative terminal of battery 15 being connected to a negative potential terminal 17. The entire circuit, except perhaps for the current sensing resistor 13, can be manufactured as a monolithic integrated circuit.

The general organization and functioning of the circuit of FIG. 1 will now be described with reference to the portions of the circuit enclosed by dashed lines, following which the circuit will be described in detail.

A sequencing circuit 21 is connected between the negative voltage supply terminal 17, and the respective terminals 12a through 12e of the flash lamp array 11 and, when a flash picture is taken, it rapidly sequences from lamp to lamp until current from the battery 15 is applied through an unflashed lamp. The current flow through a flashing lamp sets up a voltage drop in the current-sensing resistor 13, which voltage drop is sensed by a current-sensing circuit 22, which actuates a latch circuit 23 for generating an inhibit or lockout signal which is applied to the sequencing circuit 21 so as to stop its sequencing and thus prevent the flashing of more than one lamp while taking the flash picture. This general circuit arrangement and functioning is more fully described in the above-referenced patent to Watrous and Coté.

In accordance with the present invention, a compensator circuit 24 is constructed, and interconnected with the remaining circuitry, so as to apply a variable compensating voltage to the sequencing circuit 21 for causing it to operate properly over wide ranges of operating temperature and of operating voltage as supplied by the battery 15, and over a range of variable compensating current drawn by the sequencing circuit 21.

In the sequencing circuit 21, a plurality of SCR's 26a through 26e, or other suitable semiconductor switching devices having latching characteristics, are respectively connected between the terminals 12a-12e of the flash lamp array 11, and an electrical ground line 27 which is connected to the negative terminal 17 of the operating voltage source. A plurality of gating transistors 28a-28e are respectively associated with the SCR switches 26a-26e, the emitters of the gating transistors being connected to the gate electrodes of the respectively associated SCR switches. The collectors of the gating transistors 28b-28e are respectively connected to the anodes of their associated SCR switches 26b-26e, and the collector of the first gating transistor 28a is connected via a resistor 29 to the positive operating voltage terminal 14. Sequencing transistor 31b-31e are provided in all but the first of the sequencing stages for the purpose of causing sequential activation of the SCR's, and also function to apply a compensating voltage to the sequencing circuit as will be described later on. The collector of each of the sequencing transistors 31b-31e is connected to the base electrode of the associated gating transistor 28b-28e of each of the sequencing stages, and the emitters of the sequencing transistors 31b-31e are connected to a compensating voltage line 32. The base electrodes of the sequencing transistors 31b-31e are respectively connected, through resistors 33b-33e, to the anodes of the SCR switches 26a-26d in the successively preceding sequencing stages, as shown.

A plurality of lock-out transistors 36a-36e are respectively associated with the gating transistors 28a-28e, the collector electrodes of the lock-out transistors 36a-36e being respectively connected to the base electrodes of the gating transistors 28a-28e, the emitter electrodes of the lock-out transistors 36a-36e being connected to the electrical ground line 27, and the base electrodes of the lock-out transistors 36a-36e being respectively connected through resistors 37a-37e to a lock-out signal line 38. Resistors 39a-39d are respectively interconnected between the anodes of the five SCR's 26a-26e, as shown, and function to insure flashing of the lamps of the array 11 in a predetermined sequence from first to last (that is, so that the first lamp 11a will be the first to flash, and the remaining lamps will flash in sequence until the last lamp 11e is flashed) as is more fully described in the above-referenced patent application Ser. No. 299,654.

Operation of the sequencing circuit 21 is initiated by applying a trigger pulse to a trigger pulse input terminal 41, which terminal is connected via a zener diode 42 to the emitter of a first trigger transistor 43, the base of which is connected to the positive voltage terminal 14. The zener diode 42 is employed only if necessary to adjust the value of the trigger pulse input signal to properly actuate the trigger transistor 43. The collector of transistor 43 is connected via a resistor 44 to the base electrode of a second trigger transistor 46, the collector of which is connected to the low-voltage end 47 of the current sensing resistor 13. The emitter electrode of the second trigger transistor 46 is connected to the electrical ground line 27 through a pair of series connected resistors 47' and 48, the junction of which is connected to the base of transistor 28a and to the collector of transistor 36a. The trigger pulse may be obtained from a shutter-activating solenoid, or by means of a switch connected to a suitable voltage source.

Initially, the trigger transistors 43 and 46, and all of the transistors and SCR's in the sequencing circuit 21 are in the "off" condition. When taking a flash picture, or just prior to taking a flash picture, the normally open switch 16 is closed, as may be conveniently done by mechanically linking the switch 16 with the picture-taking button of the camera, in well-known manner. A trigger pulse is then applied to the trigger pulse input terminal 41, in synchronization with opening of the camera shutter, thereby rendering first trigger transistor 43 conductive, which in turn renders the second trigger transistor 46 conductive, thus applying a positive voltage potential, via the voltage divider resistors 47' and 48, to the base electrode of the first gating transistor 28a, rendering this transistor conductive and applying a positive potential from positive potential terminal 14, via resistor 29, to the gate electrode of the first SCR 26a, thus rendering this SCR conductive and forming a current path from positive voltage terminal 14 through the current sensing resistor 13, the first flashlamp 11a, and the SCR 26a to the electrical ground line 27 which is connected to the negative voltage terminal 17, whereupon the current flowing through the flash lamp 11a causes the lamp to flash. This current flow causes a voltage to be set up across the current sensing resistor 13. At this point it will be mentioned that a pair of zener diodes 52 and 53 are connected between the respective ends of the current sensitive resistor 13 and electrical ground, as shown, to suppress undesired transient voltages which may appear at the resistor 13. The aforesaid voltage drop across the current sensing resistor 13 is applied to the current sensing circuit 22, which functions in a manner to be described to apply a signal via line 54 to the latch circuit 23, which functions in a manner to be described to apply a lock-out signal over the line 38 to the base electrodes of all of the lock-out transistors 36a through 36e in the sequencing circuit 21, via the resistors 37a through 37e. This renders all of the lock-out transistors 36a through 36e conductive, thus connecting the base electrodes of all of the gating transistors 26a through 28e to electrical ground potential, or so nearly less positive than required for sequencing so that no further sequencing can occur in the sequencing circuit 21 and hence no more lamps in the array 11 will be flashed until the circuit is placed in condition to take another flash picture.

At substantially the same time that the latch circuit 23 produces the lock-out signal over line 38, it also produces a termination signal over a line 56 which is fed through a short time delay circuit 57 to a shutter and switch circuit 58 which functions to close the camera shutter (such as by deactivating the shutter solenoid) and which also functions to open the switch 16 thereby removing battery voltage from the voltage terminals 14 and 17, whereupon all of the transistors and SCR's in the circuit are restored to their initially nonconducting or "off" condition.

When the next flash picture is to be taken, a trigger pulse is again applied to the trigger pulse terminal 41, after closure of switch 16, as described before, resulting in the transistor 28a in the sequencing circuit 21 becoming conductive and applying a positive potential to the gate electrode of the first SCR 28a, as described above. However, since the first lamp 11a has been flashed, and hence is an open circuit, no current will flow through the lamp and thus no current can flow through the SCR 26a via the first lamp 11a. At this time it should be mentioned that the compensating voltage line 32, which is connected to the emitter electrode of each of the sequencing transistors 31b through 31e in the second through fifth sequencing stages, also is connected to the junction 61 of resistors 62 and 63, which are connected in series with a third resistor 64, in the order named, between the emitter electrode of the second trigger transistor 46 and the electrical ground line 27. Since, when a flash picture is being taken, the second trigger transistor 46 is conductive, and its emitter electrode is at a positive potential, the three resistors 62, 63, and 64 function as a voltage divider so that a positive potential, somewhere between electrical ground and the full positive potential at the voltage terminal 14, appears on the line 32. The exact positive potential value on the line 32 fluctuates, with varying temperature and operating voltage, due to action of the compensator circuit 24 as will be described later. When the positive potential is applied to the gate electrode of the first SCR 26a, as has just been described, this SCR is rendered sufficiently conductive to draw current from the positive voltage line 32, through the emitter-base junction of transistor 31b and through resistor 33b, thus rendering the sequencing transistor 31b conductive in the second stage, which in turn raises the base of the gating transistor 28b sufficiently positive to render this transistor conductive, via current flow through the second lamp 11b of the lamp array 11, and through the collector to the emitter of the transistor 28b, so as to apply a positive potential to the gate electrode of the second SCR 26b, thereby rendering it conductive, whereby a current path is established through the SCR 26b, the second flash lamp 11b, and the current sensing resistor 13, whereby the second lamp 11b flashes, and the current thereof is sensed by the resistor 13 and the associated circuitry, as described above, for producing a lock-out signal on the line 38 whereby no further sequencing can occur, and no further lamps will be flashed until the next flash picture is taken. The aforesaid sequencing from stage to stage in the sequencing circuit 21 occurs so rapidly that all five stages can be sequenced during the time the shutter is open for taking a flash picture, so that when the fifth lamp 11e is flashed, it becomes flashed almost as quickly as did the first lamp 11a. The aforesaid steps of circuit operation for each flash picture, consisting of stage-by-stage sequencing in the sequencing circuit 21 until a flash lamp is flashed, actuation of the current sensing circuit 22, latch circuit 23, and shutter end switch circuit 58, not only insures that a single flash lamp will be fired when taking a single picture, but also insures that the shutter will thereupon be immediately closed, and the battery switch 16 will be quickly opened, thereby reducing drain on the battery 15.

The current-sensing circuit 22 comprises, in the preferred embodiment shown, a pair of voltage dividing resistors 71, 72 connected in series between the base electrode of the second trigger transistor 46, and the electrical ground line 27. The base electrode of a transistor 73 is connected to the junction of the resistors 71 and 72, the emitter electrode thereof being connected to the electrical ground line 27. Three resistors 76, 77, and 78 are series connected, in the order named, between the high voltage end 79 of the current-sensing resistor 13 (which end is connected to the operating voltage terminal 14), and the collector electrode of the transistor 73. A diode 81 is connected across the two resistors 76 and 77, in the forward biased position as shown, so as to establish a voltage drop of approximately 0.6 volts (assuming diode 81 is a silicon diode) across these two resistors whereupon the junction 82 thereof will have a reference voltage of less than 0.6 volts less than the positive potential at the high voltage end 79 of the current-sensing resistor 13. The junction 82 of the resistors 76 and 77 is connected to the emitter of a transistor 83, the base of which is connected to the base of a transistor 84, the emitter of which is connected to the low voltage end 47 of the current-sensing resistor 13. The collector of transistor 84 is connected jointly to the base electrodes of transistors 83 and 84, and a resistor 86 is connected between this point and the collector electrode of transistor 73. The collector electrode of transistor 83 is connected to the latching signal output line 54.

The current-sensing circuit 22 functions as follows. The transistors 83 and 84 are connected in a common base differential amplifier circuit, which is rendered operational under the control of transistor 73. The three transistors in the current-sensing circuit 22 are initially in the non-conducting condition, and remain so even after the battery switch 16 is closed in connection with taking a flash picture. When a trigger pulse is applied to the trigger pulse terminal 41, the ensuing positive potential at the base of the second trigger transistor 46 is applied, via voltage divider resistors 71 and 72, to the base of transistor 73 rendering it substantially fully conductive and effectively connecting the lower end of resistor 86 to electrical ground. This actuates the differential amplifier circuit comprising transistors 83 and 84, which generates a positive potential latching output signal at line 54 in response to a sufficient voltage developed across the current-sensing resistor 13 in response to current flow to a flashing lamp in the flash lamp array 11. The threshold of the differential amplifier 83–84 is determined by the relative values of resistors 76 and 77 with respect to the voltage drop across the diode 81. The current-sensing circuit 22 is more fully described and claimed in the above-referenced patent application Ser. No. 299,653.

The latch circuit 23 receives the incoming latching signal over line 54 from the current-sensing circuit 22, and in response thereto produces a lock-out signal on the line 38 which is applied to the sequencing circuit 21 as has been described above. The latch circuit 23 comprises a pair of transistors 91, 92 connected together in a regenerative feedback manner, the base of transistor 91 being connected to the collector of transistor 92 and the base of transistor 92 being connected to the collector of transistor 91, so that the two transistors become conductive simultaneously when actuated. The base of transistor 92 and collector of transistor 91 are connected together and to electrical ground via a resistor 93, the emitter of transistor 91 is connected jointly to the base of transistor 91 and collector of transistor 92 via a resistor 94, and also is connected to the positive operating voltage terminal 14 via a load resistor 96. The emitter of transistor 92 is connected to the ground line 27. An actuating transistor 97 has its emitter connected to electrical ground, and its collector is connected jointly to the collector of transistor 91 and base of transistor 92, and also is connected to the incoming latching signal line 54. The base of transistor 97 is connected to the junction of a capacitor 98 and a resistor 99 which are series connected, in the order named, between the emitter of transistor 91 and electrical ground. The value of the capacitor 98 may be very small, so that it can be formed as an integral part of a monolithic integrated circuit.

When an incoming positive potential latching signal appears on the line 54, jointly at the collector of transistor 91 and base of transistor 92, these transistors become conductive simultaneously, producing a negative going voltage at the junction 101 of the load resistor 96 and emitter of transistor 91, which negative going voltage is applied via a resistor 102 to the base of an amplifier transistor 103 the emitter of which is connected to the positive operating voltage terminal 14, and the collector of which is connected to the lock-out signal line 38, whereby a positive going lockout voltage is produced on the line 38 upon actuation of the latch circuit 23. A resistor 104 is connected between line 38 and the ground line 27. The transistor 97, and capacitor 98 and resistor 99, comprise a transient voltage blocking circuit, to prevent false actuation of the latching circuit due to transient voltages which may appear in the electrical line connected to the positive operating voltage terminal 14. If such a transient voltage should appear, of positive potential, it is applied via capacitor 98 to the base electrode of transistor 97, rendering this transistor conductive and substantially electrically grounding the base electrode of the transistor 92, thereby preventing the latching transistors 91 aNd 92 from being falsely rendered conductive by a transient voltage. The latch circuit 23 and its transient voltage blocking feature comprising transistor 97, capacitor 98 and resistor 99, is more fully described and claimed in the above-referenced patent application Ser. No. b 299,651.

The lock-out signal point 101 is connected via a resistor 106 to the base of a amplifier transistor 107, the emitter of which is connected to the positive operating voltage terminal 14, and the collector of which is connected to electrical ground via a load resistor 108. The termination signal line 56, which has been described above, is connected to the collector of the transistor 107.

In accordance with the invention, the compensator circuit 24 is provided with a transistor amplifier, consisting of a pair of cascade-connected transistors 111 and 112 in the preferred embodiment, connected in series with a load resistor 62, this series combination being connected between the electrical ground line 27 and the emitter of the second trigger transistor 46 (at which the sequence-actuating signal appears when a flash picture is taken). The base of transistor 111 is connected to the junction of resistors 63 and 64, the collector thereof is connected to the junction 61 of resistors 62 and 63, and the emitter thereof is connected to the base of transistor 112. The emitter of transistor 112 is connected to the electrical ground line 27, and the collector thereof is connected to the junction 61 of resistors 62 and 63. In one specific circuit, the resistances of resistors 62, 63, and 64 are 200 ohms, 100 ohms, and 330 ohms, respectively.

The compensator circuit 24 functions as follows. When a flash picture is taken, a sequence actuating signal is applied via the line 45, to the sequencing transistor 28a in the first sequencing stage, via the voltage divider comprising resistors 47 and 48, as has been described above. The sequence actuating signal, which is of positive voltage polarity, also is applied, from the junction 61 in the voltage divider network of resistors 62, 63, and 64, to the line 32 and hence is applied to the emitter electrodes of the sequencing transistors in each of the sequencing stages (except for the first stage), and is of such a value as to enable the sequencing stages to properly sequence from one stage to the next, until a flash lamp is flashed. In accordance with the invention, the value of the sequencing control voltage on line 32 is affected by the transistor amplifier arrangement comprising one or more cascaded transistors 111–112 connected in series with the resistor 62 functioning as a load circuit for the amplifier. The resistor 62 can be replaced by a constant current source or other current feed means. The voltage divider resistors 63 and 64 are such as to apply a bias voltage to the base of the first amplifier transistor 111, so that the amplifier 111–112 is partially conductive. Therefore, if the battery operating voltage applied across terminals 14 and 17 should increase from optimum value, relatively greater bias voltage is applied to the base electrode of the first amplifier transistor 111, rendering the amplifier transistors 111–112 relatively more conductive, thus drawing more current through their load resistor 62, and thus lowering the D.C. voltage at the line 32, thereby partially compensating for the tendency for this voltage to increase due to the increased voltage of battery 16. If the voltage of the battery 16 should decrease, for instance to as low as 4 volts from its nominal value of 6 volts, the transistor amplifier 111–112 will become relatively less conductive, thereby drawing less current through the load resistor 62, whereby the D.C. voltage at line 32 will be relatively greater than it would otherwise become due to the lower voltage of the battery 16. A single transistor 111 will suffice, but will provide different voltage compensation, whereas additional amplifier transistors cascaded to the second transistor 112 in the same manner as the transistor 112 is connected to the transistor 111, will provide still different control on the value of D.C. voltage at the line 32. Also, changing the relative values of resistors 63 and 64 will change the operating characteristics of the circuit. Without the aforesaid voltage compensation, a reduction in voltage of the battery 16 might tend to cause the sequencing circuit 21 to fail to sequence, resulting in failure of a lamp to flash when taking a flash picture. Conversely, if the voltage of battery 16 were to increase, without the compensating circuit 24, the sequencing circuit 21 might tend to falsely sequence one or more times in addition to the desired flashing of a single lamp, resulting in the flashing of two or more lamps per flash picture.

FIG. 2 shows a plot of typical curves illustrating the operation of the compensator circuit 24 when the first lamp 11a is being flashed, and these curves will shift as each successive lamp is flashed. In FIG. 2, the vertical axis 116 represents current flow, in milliamperes, through the compensator circuit 24 comprising resistors 63 and 64 and transistors 111 and 112, and the horizontal axis 117 represents the compensator voltage output, in volts, at point 61 and the line 32. The solid line curve 118 is a plot of compensator voltage at the line 32, versus compensator current flow. When each lamp is being flashed, the compensating voltage, as produced by the compensator circuit 24, lies on a point of curve 118. The solid line 119, which appears to be substantially vertical (but actually slopes slightly toward the upper right) represents the minimum voltage on the compensating voltage line 32 at which the sequencing circuit 21 will sequence properly; at a lower voltage value, no sequencing will occur, and hence no lamps can be flashed (except perhaps for the first lamp which does not require sequencing). The solid line 121 represents the maximum voltage on the line 32 at which the sequencing circuit 21 will properly sequence; at greater voltages the circuit 21 is likely to falsely sequence and undesirably flash one or more lamps in the array 11. The substantially horizontal lines 122–125 represent various values of operating voltage supplied by the battery 15, in 1-volt steps, from a maximum of b 6 volts as represented by the line 122, to a minimum of 3 volts as represented by the line 125. The voltage lines 122–125 are at slanting angles on the plot of FIG. 2, due to voltage drop in the load resistor 62, in accordance with Ohm's law. Thus, for six volts of operating voltage, the reliable sequence operating range lies between the point 126 and 127 on the voltage line 122. Similarly, for 5 volts of operating battery voltage supplied from battery 15, the operating range lies between points 128 and 129 on the 5-volt battery line 123, etc. As shown in FIG. 2, the compensator voltage output 118 lies between the operating range lines 119 and 122, from the maximum 6 volt supply voltage, down to a supply voltage of about four volts as represented by the line 124. The compensator circuit 24 is purposely designed so that the compensator output voltage curve 118 lies closer to the minimum sequencing line 119 than to the maximum sequencing range line 121, because it is considered more desirable that there be no sequencing than that there be false sequencing. Without the voltage compensation provided by the transistor amplifier 111–112 (i.e., with the transistors omitted and the resistor values suitably adjusted), the D.C. voltage at line 32 in the circuit of FIG. 1 would vary linearly with varying voltage of battery 15, and would appear on the plot of FIG. 2 as shown in the dashed line 131, from which it can be seen that the sequencing circuit 21 would sequence properly over a very narrow voltage range of approximately 1 volt or less drop from the nominal 6 volts of the battery 15. Furthermore, after the first lamp 11a has been flashed, the flashing of each further successive lamp would incur current flow over the line 32 to successively increasing numbers of emitters of the sequencing transistors 31, resulting in successively increasing voltage drops across resistor 62, and hence the operating line 131 would move in successive jumps to the left.

The compensator circuit 24 also compensates with respect to changes in operating temperature. Silicon semiconductor devices such as the SCR's and sequencing and gating transistors 31 and 28 in each of the sequencing stages, typically have an inherent minus 2 millivolts per degree C temperature coefficient. Due to this effect on the SCR's and their succeeding sequencing transistor 31, with increasing operating temperature the optimum operating voltage should be decreased by a suitable amount. In accordance with a feature of the invention, the transistor amplifier 111–112 has substantially the same temperature coefficient as the sequencing transistors, thereby to vary the compensator voltage value on line 32 in a direction to compensate for the temperature-dependent varying operating characteristics of the sequencing and gating transistors 31 and 28. In FIG. 2, the solid line curves 118, 119, and 121, which have been described above, are for a circuit operating temperature of 25°C. If the circuit operating temperature increases, the three curves move simultaneously to the left, by the same distance. For example, the dashed line curves 119', 118', and 121' show the positions that the solid lines 119, 118, and 121 assume, respectively, at an operating temperature of 75°C, it being noted that the compensator voltage curve 118' remains in its relative position between the minimum and maximum operating range lines 119', 121', for providing suitable sequencing operation between an operating voltage of 6 volts and 4 volts. Similarly, at operating voltages less than 25°C, the three solid-line curves 119, 118, and 121, would simultaneously shift toward the right, retaining their relative positions, thereby providing compensation for a decrease in operating temperature and insuring suitable sequencing operation of the sequencing circuit 29 over a wide range of operating temperature. For example, such a circuit sequences properly from temperatures below 0°C to about 100°C.

In accordance with another feature of the invention, the compensating voltage at line 32 is regulated, by the compensator circuit 24, with respect to the successively increasing amounts of current drawn by the emitters of the sequencing transistors 31 as each of the second through fifth lamps 11b–11e is flashed. This increasing current is due to the fact that each additional successive sequencing transistor 31 draws emitter current as each successive lamp is flashed. As the current in line 32 thus increases, the voltage drop across the resistor 62 (through which the compensator current flows) tends to increase, thus tending to reduce the value of compensating voltage at line 32. However, this tendency toward reduced voltage results in reduced bias (via resistance voltage divider 63–64) at the base of transistor 111 (and also 112); thereby the transistors draw less current through the resistor 62, resulting in a substantially constant regulated compensating voltage at line 32 with respect to variation in current flow therein.

In accordance with a feature of the invention, the collector electrode of the second trigger transistor 46 is connected to the low voltage end 47 of the current sensing resistor 13, rather than being connected to the positive voltage supply terminal 14. Because of this connection to the low voltage end 47 of resistor 13, when a lamp in the array flashes, the voltage drop across the resistor 13 due to the current flow therein, brings down the voltage at point 47 to a value substantially less than the 6 volt nominal operating voltage of battery 16, for instance to as low as 1 or 2 volts temporarily, and this considerably lower voltage is passed along the line 45 to the load resistor 62 of the compensator circuit 24. Remembering that the circuit 24 does not provide perfect voltage compensation, i.e. it is not a voltage regulator, but instead is a voltage modifier (with respect to the operating input voltage), the voltage at line 32 will also become reduced, thus tending to prevent any further sequencing in the circuit 21 and helping to insure that only a single lamp in the array 11 will be flashed per flash picture.

While preferred embodiments of the invention have been shown and described, various other embodiments and modifications thereof will become apparent to persons skilled in the art, and will fall within the scope of invention as defined in the following claims. For example, the semiconductor devices can be turned around and connected in reverse in their positions in the circuit, and PNP transistors can be substituted for NPN transistors, and vice versa, along with reversal of polarity of the operating voltage source.

What I claim as new and desire to secure by Letters Patent of the United States is:

1. In a circuit for sequentially flashing a plurality of photoflash lamps and comprising a plurality of electrical terminals adapted to be connected respectively to filaments of said flash lamps, a pair of operating voltage terminals, and a sequencing circuit comprising a plurality of semiconductor switch devices connected in circuit paths respectively between said plurality of electrical terminals and one of said operating voltage terminals, said sequencing circuit further comprising a plurality of sequencing circuit stages successively connected from one to another of said semiconductor switch devices, each of said sequencing stages including a semiconductor sequencing device the operating characteristics of which are subject to change with changes in operating temperature and voltage, the improvement comprising a temperature and voltage compensator circuit comprising a transistor amplifier including a current feed means, electrical means connecting said amplifier and its current feed means in series in a circuit across said operating voltage terminals thereby causing a compensating voltage to be produced in said current feed means, and electrical means connecting a point of said current feed means that is between said operating voltage terminals to an electrode of at least one of said semiconductor sequencing devices so as to apply said compensating voltage to said sequencing device.

2. A circuit as claimed in claim 1, including a current-sensing element connected in a current path between said flash lamps and a first one of said operating voltage terminals, and electrical means connecting said amplifier and its current feed means in series between the second one of said operating voltage terminals and the end of said current sensing element which is nearest in the circuit to said flash lamps.

3. A circuit as claimed in claim 1, in which said amplifier comprises means connecting a first end of said current feed means to a first one of said operating voltage terminals, a pair of series-connected resistors connected at one end thereof to the second end of said current feed means, electrical means connecting the other end of said pair of resistors to the second one of said operating voltage terminals, and a transistor having a base electrode connected to the junction of said pair of resistors, a collector electrode connected to said second end of the current feed means and electrical means connecting the emitter electrode of said transistor to said second one of the operating voltage terminals.

4. A circuit as claimed in claim 3, in which said amplifier comprises a second transistor having a base electrode connected to the emitter electrode of the first transistor, a collector electrode connected to the collector electrode of the first transistor, and an emitter electrode connected to said other end of the pair of transistors.

5. A circuit as claimed in claim 3, including a current-sensing element connected in a current path between said flash lamps and said first one of the operating voltage terminals, and electrical means connecting said amplifier and its current feed means in series between said second one of the operating voltage terminals and the end of said current sensing element which is nearest in the circuit to said flash lamps.

6. A circuit as claimed in claim 1, in which each of said semiconductor switch devices is an SCR having anode and cathode current electrodes and in which each of said semiconductor sequencing devices is a transistor, said circuit including electrical means connecting the base electrode of each sequencing transistor to a current electrode of the preceding SCR and electrical means connecting the collector electrode of each sequencing transistor to the gate electrode of the succeeding SCR, and electrical means connecting the emitter electrodes of all of said sequencing transistors to said point of the current feed means in the compensator circuit.

7. A circuit as claimed in claim 6, including a current-sensing element connected in a current path between said flash lamps and a first one of said operating voltage terminals, and electrical means connecting said amplifier and its current feed means in series between the second one of said operating voltage terminals and the end of said current-sensing element which is nearest in the circuit to said flash lamps.

8. A circuit as claimed in claim 6, in which said means connecting the collector electrode of each sequencing transistor to the gate electrode of the succeeding SCR comprises a plurality of gating transistors each having a base electrode connected to the collector electrode of the preceding sequencing transistor, and a collector electrode and an emitter electrode respectively connected to a current electrode and the gate electrode of the succeeding SCR.

9. A circuit as claimed in claim 8, in which each of said sequencing circuit stages further includes a lock-out transistor having a collector electrode connected to said base electrode of the gating transistor, an emitter electrode connected to a point of reference potential, and a base electrode, said circuit further including means for producing a lock-out signal in response to the flashing of one of said flash lamps, and electrical means connected to apply said lock-out signal to all of said base electrodes of the lock-out transistors.

10. A circuit as claimed in claim 9, in which said amplifier in the compensator circuit comprises electrical means connecting a first end of said current feed means to a first one of said operating voltage terminals, a pair of series-connected resistors connected at one end thereof to the second end of said current feed means, electrical means connecting the other end of said pair of resistors to the second one of said operating voltage terminals, and a transistor having a base electrode connected to the junction of said pair of resistors, a collector electrode connected to said second end of the current feed means, and electrical means connecting the emitter electrode of said transistor to said second one of the operating voltage terminals.

11. A circuit as claimed in claim 10, including a current-sensing element connected in a current path between said flash lamps and said first one of the operating voltage terminals, and electrical means connecting said amplifier and its current feed means in series between said second one of the operating voltage terminals and the end of said current sensing element which is nearest in the circuit to said flash lamps.

* * * * *